United States Patent
Florczyk et al.

(10) Patent No.: US 7,117,762 B2
(45) Date of Patent: Oct. 10, 2006

(54) BICYCLE GEAR INDICATOR MECHANISM

(75) Inventors: Raymond Florczyk, Schwebheim (DE); Marcus Auer, Schwebheim (DE); Christian Buettner, Wuerzburg (DE); Hung-I Chen, Taichung (TW)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 10/508,469

(22) PCT Filed: Apr. 10, 2003

(86) PCT No.: PCT/US03/10979

§ 371 (c)(1),
(2), (4) Date: Sep. 21, 2004

(87) PCT Pub. No.: WO03/086849

PCT Pub. Date: Oct. 23, 2003

(65) Prior Publication Data

US 2005/0172752 A1 Aug. 11, 2005

(51) Int. Cl.
*G05G 11/00* (2006.01)
*F16C 1/12* (2006.01)

(52) U.S. Cl. .................... 74/501.6; 116/28.1
(58) Field of Classification Search ........... 74/501.6, 74/502.2, 489, 506, 473.3, 500.5; 116/28.1, 116/284, 305
See application file for complete search history.

(56) References Cited

U.S. PATENT DOCUMENTS 5,134,897 A * 8/1992 Romano ............... 74/489
5,458,018 A * 10/1995 Kawakami ............ 74/502.2
6,431,020 B1 * 8/2002 Iteya et al. ........... 74/502.2
6,647,824 B1 * 11/2003 Watarai .............. 74/502.2
6,681,652 B1 * 1/2004 Auer et al. ........... 74/501.6

FOREIGN PATENT DOCUMENTS

| DE | 100 01 084 | 7/2001 |
|----|------------|--------|
| DE | 100 09 214 | 8/2001 |
| DE | 201 07 679 | 8/2001 |
| EP | 0 423 779 | 4/1991 |
| EP | 0 759 393 | 2/1997 |
| EP | 0 763 463 | 3/1997 |
| FR | 1 538 932 | 9/1968 |

* cited by examiner

*Primary Examiner*—Chong H. Kim
(74) *Attorney, Agent, or Firm*—Milan Milosevic; Lisa Serdynski

(57) ABSTRACT

A rotatable handgrip shifting device (10) that is mountable on a bicycle handlebar and connected to a bicycle gear changing mechanism by a cable within a tube and reversibly operable at discrete shift points corresponding to the gears of the bicycle gear changing mechanism. The shifting device (10) includes a handgrip (34) rotatable about the handlebar, a spool (30) rotatable with the handgrip (34) and a housing (12) that secures the shifting device (10) to the handlebar. The housing (12) includes a gear display (18) denoting a plurality of discrete shift points of the gear changing mechanism. A flexible member (40) includes at one end a pointer (44) and a spool tab (42) at another end. The pointer (44) is reciprocally displaceable along the gear display (18) in response to rotation of the handgrip (34). The spool tab (42) is removably attachable to the spool (30) or the handgrip (34) and configured such that the flexible member (40) spools at a radius permitting alignment of the pointer (44) with the plurality of discrete shift points denoted on the gear display (18).

8 Claims, 7 Drawing Sheets

shifting device of FIG. 1;

BICYCLE GEAR INDICATOR MECHANISM

TECHNICAL FIELD

This invention relates to bicycle gear indicator mechanisms and more particular to a bicycle gear indicator mechanism that allows adjustment of the stroke of a pointer to accommodate different gear changing mechanisms.

BACKGROUND OF INVENTION

Bicycle gear shifting systems include a shifting device connected by a cable within a tube to a gear changing device such as a derailleur or an internal gear hub. Such devices are described in U.S. Pat. Nos. 5,476,019, 5,524,501, and 5,662,000, also owned by the assignee of this invention, and are incorporated herein. In conventional bicycle gear shifting systems, the spacing of the detent notches is generally dictated by the gear changing mechanism used. Typically, a gear changing mechanism that doubles the spacing of the detent notches may double the stroke of the pointer along the display of a gear indicator, thereby lengthening the display window. It is therefore beneficial to create a gear indicator mechanism allowing control of the stroke of the pointer along the display regardless of the particular gear changing mechanism used.

SUMMARY OF THE INVENTION

The present invention provides a bicycle gear indicator mechanism for a rotatable handgrip shifting device that allows adjustment of the stroke a pointer to accommodate different gear changing mechanisms. The rotatable handgrip shifting device is mountable on bicycle handlebar and is connected to a bicycle gear changing mechanism by a cable within a tube. The shifting device is reversibly operable at discrete shift points corresponding to the gears of the bicycle gear changing mechanism. The shifting device includes a handgrip rotatable about the handlebar and a spool rotatable with the handgrip. The shifting device includes a housing secured to the handlebar by a clamp. The housing includes a gear display denoting a plurality of discrete shift points of the gear changing mechanism. A discrete flexible member extends between the spool and the gear display. Alternatively, the flexible member may connect the handgrip to the gear display. The flexible member has a pointer at one end and a spool tab at another end. The pointer is reciprocally displaceable along the gear display in response to the rotation of the handgrip. The spool tab is removably attached to the spool or the handgrip such that the flexible member spools at a radius permitting alignment of the pointer with the plurality of discrete shift points denoted by a gear indicator numbers on the gear display.

These and other features and advantages of the invention will be more fully understood from the following description of certain embodiments of the invention taken together with the accompanying drawings.

DETAILED DESCRIPTION

Figure 1:
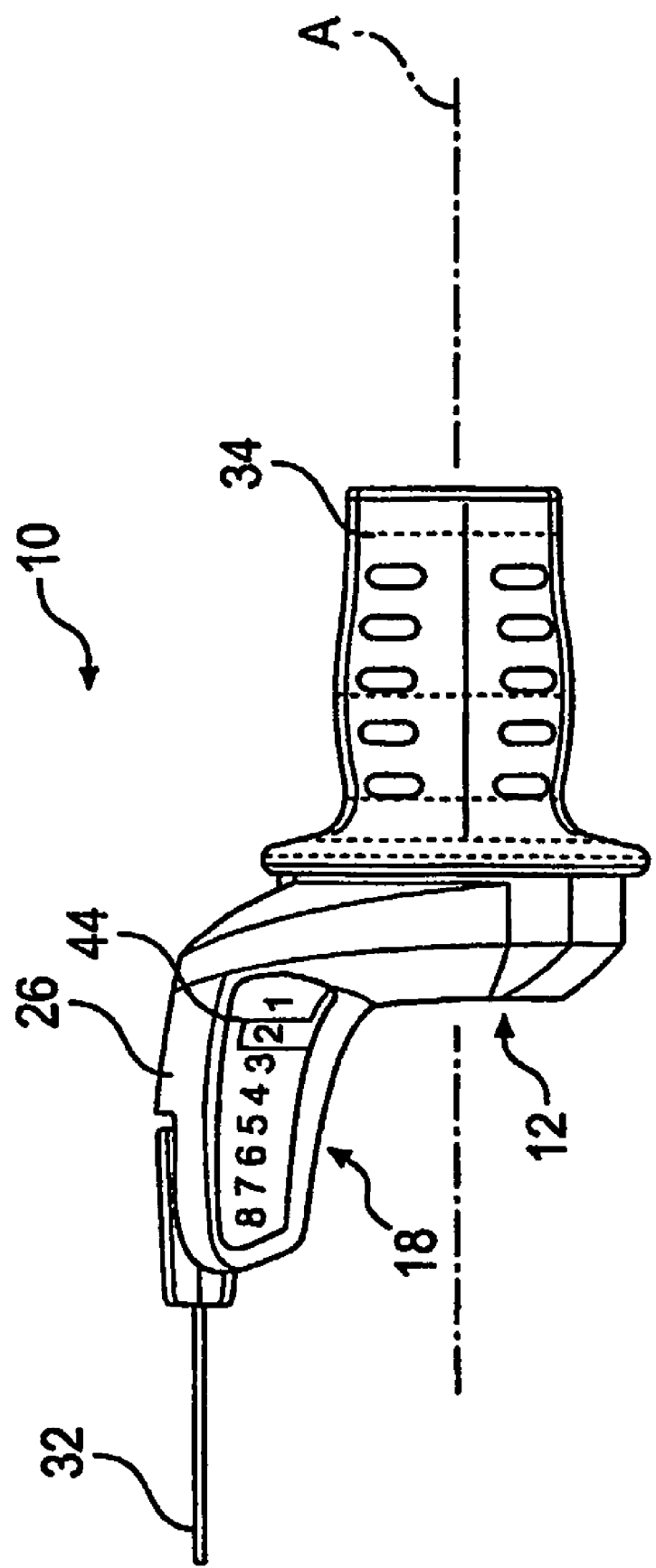
FIG. 1 is a top view of a rotatable handgrip shifting device in accordance with one embodiment of the present invention.
Figure 2:
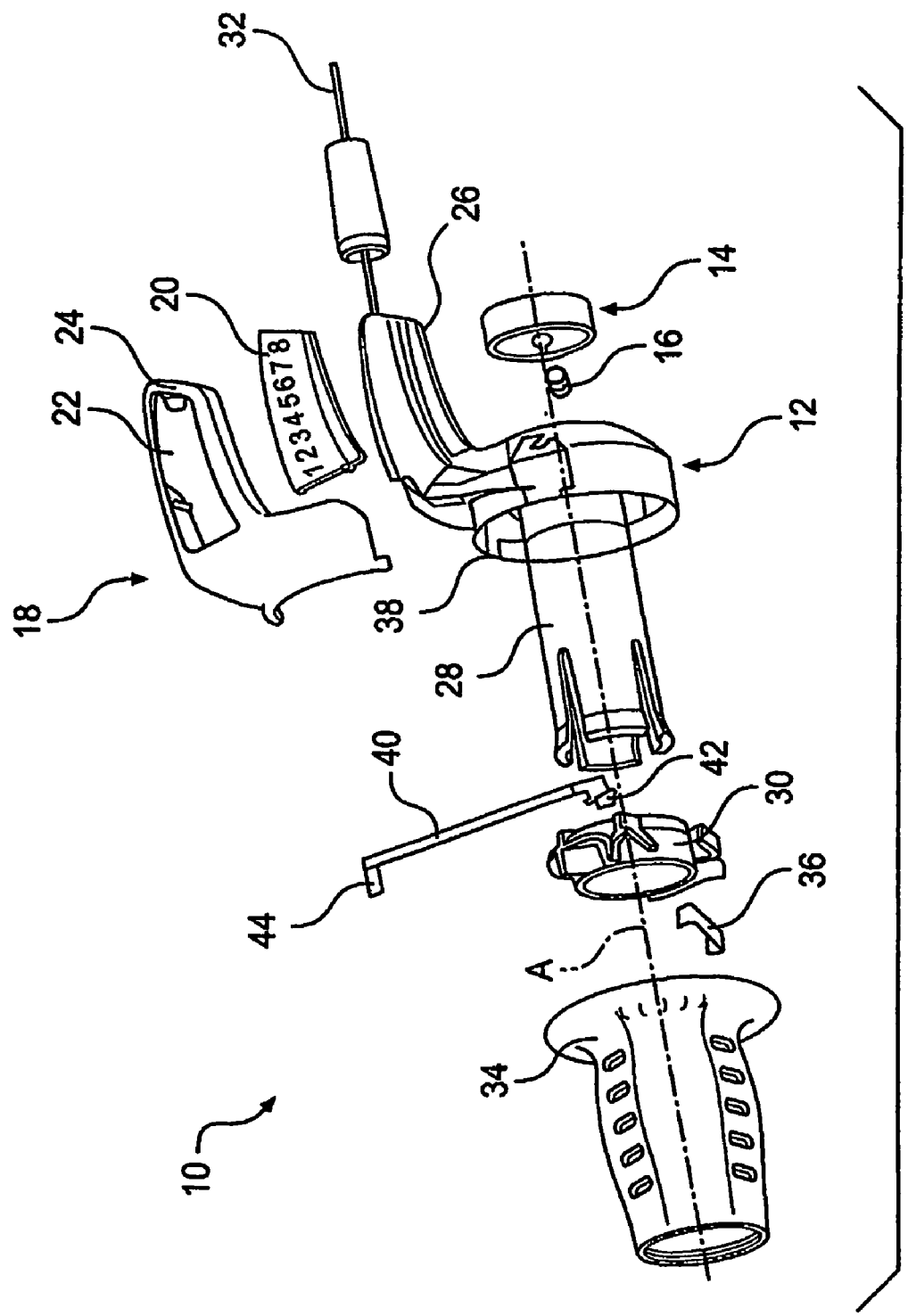
FIG. 2 is an exploded isometric view of the shifting device of FIG. 1.
Figure 3:
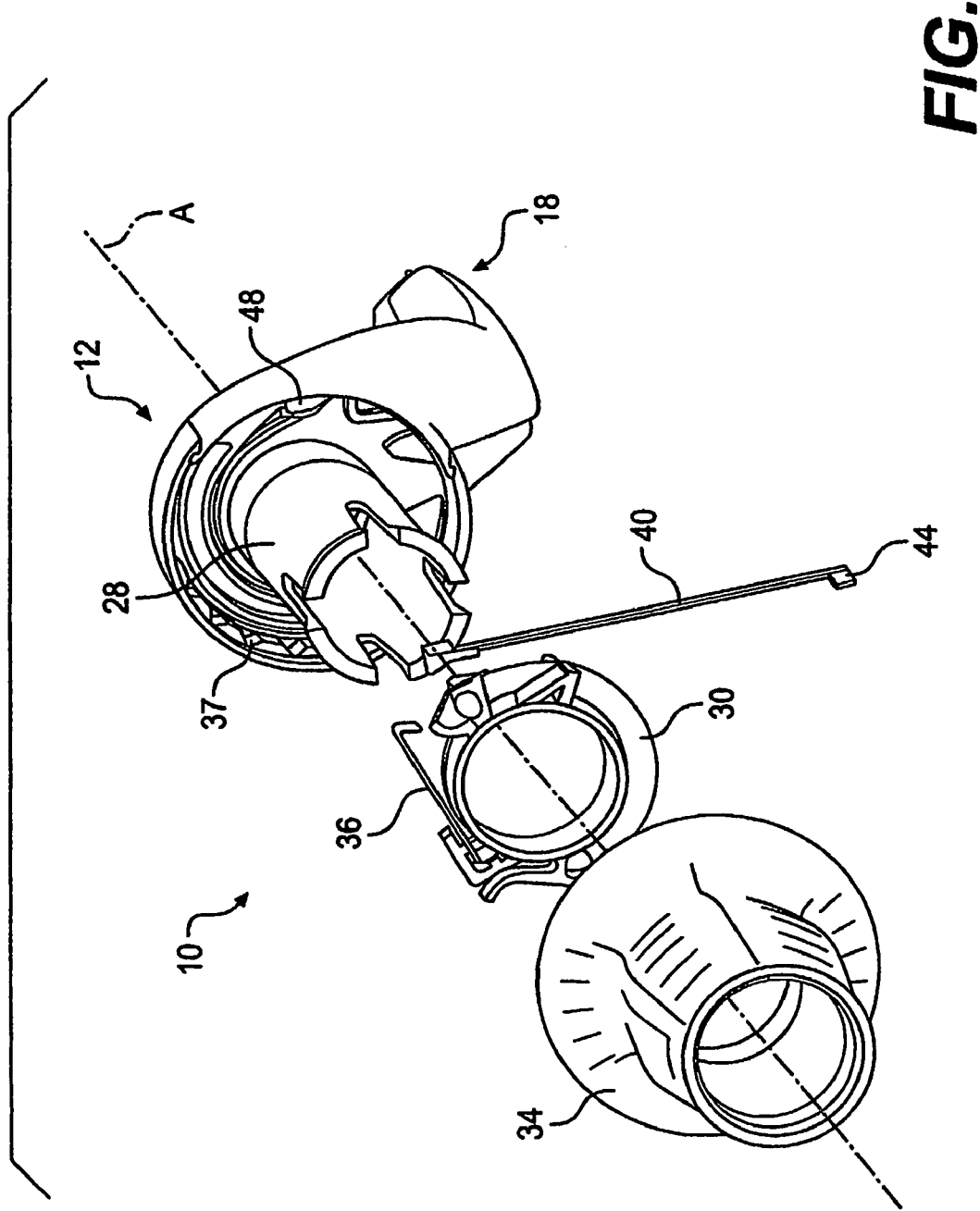
FIG. 3 is a partially exploded isometric view of the shifting device of FIG. 1.

Referring to FIGS. 1–3 of the drawings, numeral 10 generally indicates a handgrip shifting device rotatable about a handlebar axis A. The shifting device 10 includes a housing 12 that is secured to a bicycle handlebar (not shown) by a clamp 14 and a set screw 16. The housing 12 includes a gear indicator 18 generally located at or near a cable inlet or noodle 26. The gear indicator 18 includes a clear display 20 mounted within a display window 22 of a display cover 24 mounted on the housing 12. A plurality of gear indicator numbers are viewable through the display window 22. Although a linear display 20 is shown in figures, alternative display configurations are possible including circular or arched displays.

The housing 12 further includes a tubular mandrel 38 projecting along the handlebar axis A. A spool 30 is rotatable mountable on the mandrel 28. A first end of a control cable 32 is connected to a gear changing mechanism (not shown). A second end of the control cable 32 is routed through the noodle 26 of the housing 12 and attached to the spool 30. A handgrip 34 is likewise rotatably mounted on the mandrel 28 of the housing 12, the spool 30 rotatable with the handgrip 34. Although spool 30 is shown to be coaxially rotatable about an axis offset from the handlebar axis A. One end of a detent spring 36 is mounted on the spool 30. A free end of the detent spring 36 being engageable with an array of detent notches 37 located circumferentially about an inner surface of a wall 38 of the housing 12. The location of the array of detent notches 37 being interchangeable with the location of the end of the detent spring 36 mounted on the spool 30. Additional detenting configurations between the spool 30, detent spring 36, notches 37, and housing 12 exist to discretely position handgrip 34. Rotation of the handgrip 34 by a rider causes rotation of the spool 30 thereby moving the free end of the detent spring 36 from one notch to another notch, the spacing of the notches generally dictated by the spacing of the gears in the gear changing mechanism. Although in the shown embodiment of the spool 30 is discrete from the handgrip 34, in alternative embodiments the spool 30 may be integral to the handgrip 34.

As shown in FIGS. 2–5, a flexible member 40 includes a spool tab 42 and a pointer 44. The spool tab 42 is removably attachable to a slot 46 located on the spool 30 or alternatively on the handgrip 34 as shown in FIG. 6. The pointer 44 of the flexible member 40 is routed through an aperture 48 in the housing 12 and into the noodle 26 to be viewable along the display 20. Rotation of the handgrip 34 reciprocally displacing the pointer 44 along the display 20 as the flexible member 40 is spooled about the mandrel 28 of the housing 12.

Figure 4:
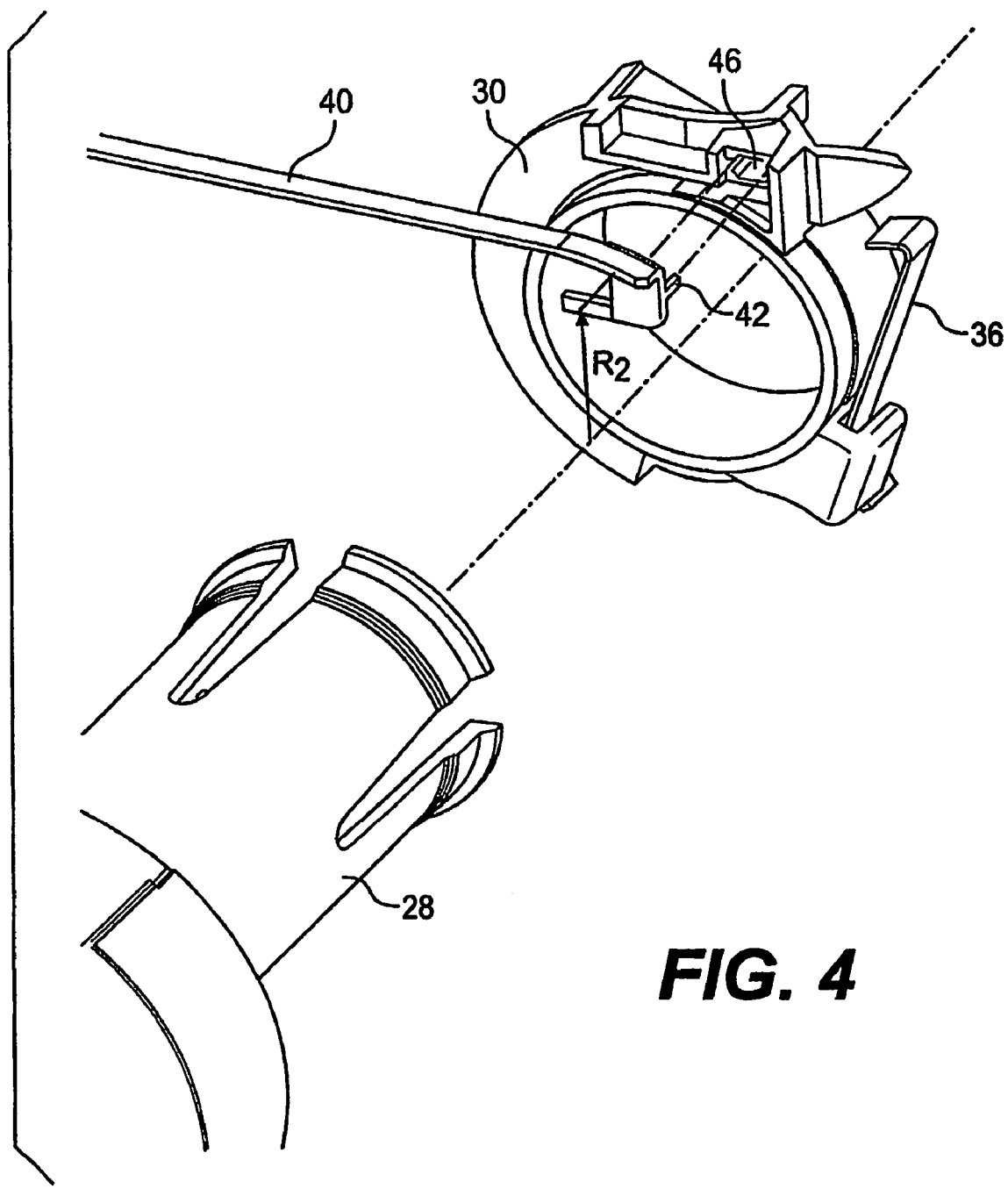
FIG. 4 is a detail isometric view of the embodiment of the shifting device of FIG. 1.
Figure 5:
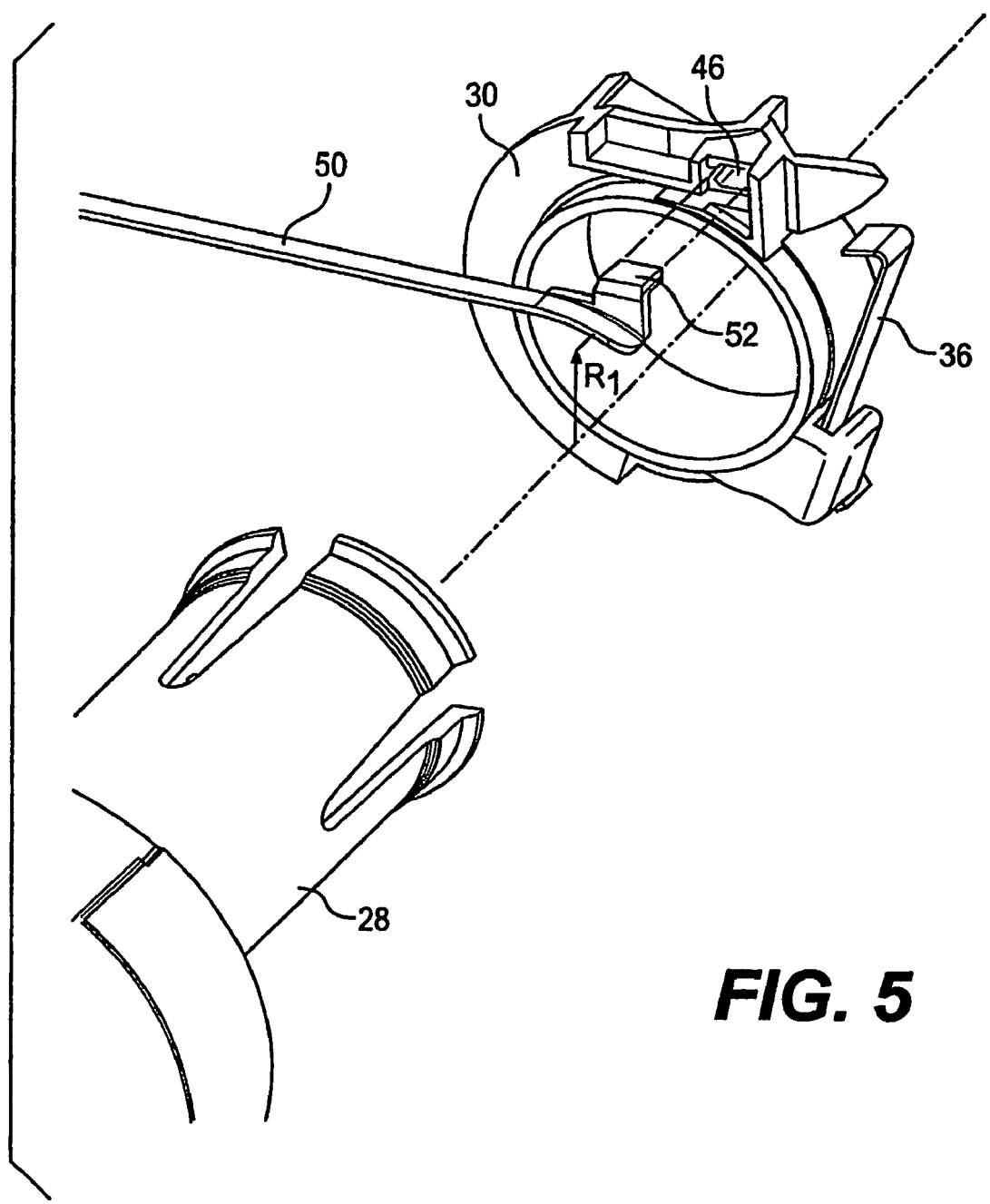
FIG. 5 is a detail isometric view of another embodiment of the shifting device of the present invention.
Figure 6:
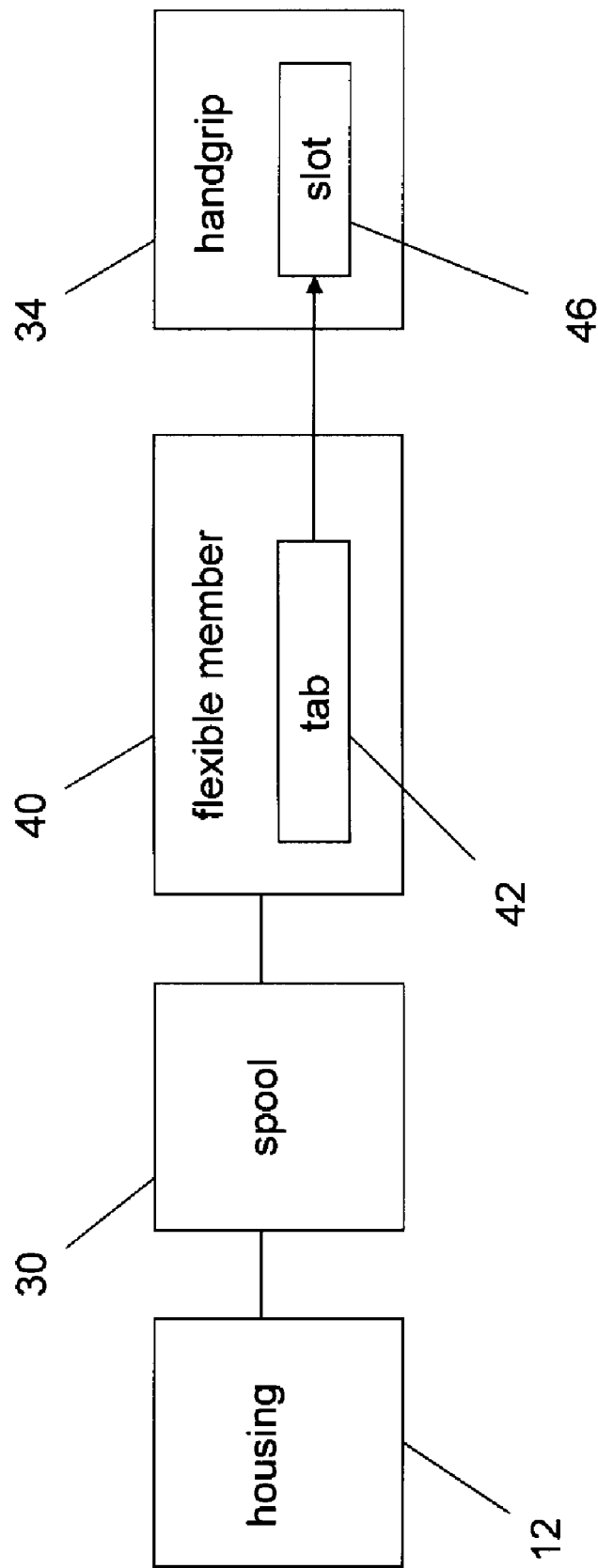
FIG. 6 is a block diagram of another embodiment of the present invention.
Figure 7:
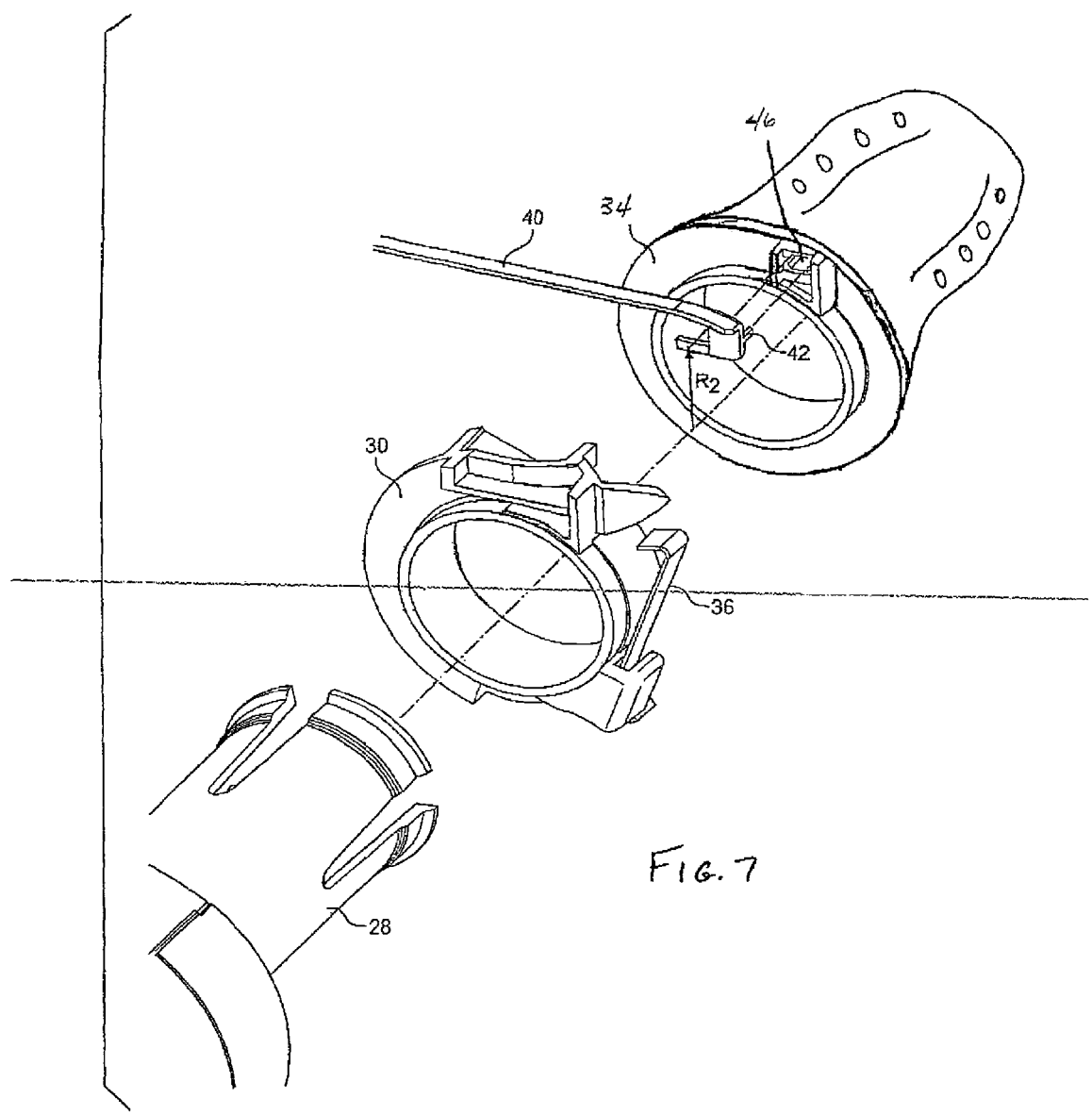

As further shown in FIGS. 4 and 5, the spool tab 42 of the flexible member 40 may be alternatively configured to cause the flexible member 40 to be spooled about the mandrel 28 at varying radii. In this embodiment of FIG. 4, a spool tab 42, insertable in the slot 46, causes the flexible member 40 to be spooled at a larger radius R2. Alternatively, in the embodiment of FIG. 5, a spool tab 52, insertable in the slot 46, causes the flexible member 50 to be spooled at a smaller radius R1. By varying the radius at which the flexible member 40 is spooled about the mandrel 28, one may control the stroke of the pointer 44 along the display 20 for any given gear changing mechanism. In doing so, the spacing of the gear indicator numbers along the display may also be controlled.

As shown in FIGS. 1–5, the gear indicator 18 is generally located along or proximate the noodle 26 of the housing 12 and orientated to maximize viewability of the display 20 by the rider. Additionally, location of the gear indicator 18 along or near the noodle 26 allows for compact packaging of the gear indicator 18 within the housing 12.

While this invention has been described by reference to several preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A rotatable handgrip shifting device mountable on a bicycle handlebar and connected to a first bicycle gear changing mechanism by a cable within a tube and reversibly operable at discrete shift points corresponding to the gears of the first bicycle gear changing mechanism, the shifting device comprising:
    a handgrip rotatable about the handlebar;
    a spool rotatable with the handgrip;
    a housing secured to the handlebar and including a first gear display indicating a first plurality of discrete shift points of the first gear changing mechanism; and
    a first flexible member having, a first pointer at a first end and a first spool tab at a second end,
    the first flexible member configured such that the first pointer is reciprocally displaceable along the first gear display in response to rotation of the handgrip,
    the first spool tab being removably attachable to one of the said spool and said handgrip, the first spool tab configured such that the first flexible member spools about a handlebar axis at a first radius permitting alignment of the first pointer with the first plurality of discrete shift points indicated on the first gear display; and
    the first gear changing mechanism, the first gear display, and the first flexible member being interchangeable with a second gear changing mechanism, a second gear display, and a second flexible member, respectively,
    the second member having a second pointer at a first end and a second spool tab at a second end,
    the second flexible member configured such that the second pointer is reciprocally displaceable along the second gear display in response to rotation of the handgrip,
    the second spool tab being removably attachable to one of said spool and said handgrip, the second spool tab configured such that the second flexible member spools about the handlebar axis at a second radius permitting alignment of the second pointer with the second plurality of discrete shift points indicated on the second gear display.

2. The rotatable handgrip shifting device of claim 1, wherein said flexible member extends between said spool and said gear display.

3. The rotatable handgrip shifting device of claim 1, wherein said flexible member extends between said handgrip and said gear display.

4. The rotatable handgrip shifting device of claim 1, wherein said spool has a slot for receiving said spool tab.

5. The rotatable handgrip shifting device of claim 1, wherein said handgrip has a slot for receiving said spool tab.

6. The rotatable handgrip shifting device of claim 1, wherein said housing includes a cable inlet for receiving the cable and the gear display substantially located at said cable inlet of said housing.

7. The rotatable handgrip shifting device of claim 1, wherein said housing includes a cable inlet for receiving the cable and the gear display located above said cable inlet of said housing.

8. A method of adapting a shifting device for use with different gear change mechanisms, the shifting device having a housing secured to a handlebar, a handgrip rotatable about the handlebar and a spool rotatable with the handgrip, said method comprising the steps of:
    providing a first flexible member, a first gear display and a first gear mechanism, the first flexible member having a first potter at a first end and first spool tab at a second end, the first flexible member configured such that the first pointer is reciprocally displaceable along the first gear display in response to rotation of the handgrip, the first spool tab being removably attachable to one of said spool and said handgrip, the first flexible member configured to spool about a handlebar axis at a first radius in response to rotation of the handgrip, the first gear display indicating a first plurality of discrete shift points of the first gear changing mechanism;
    providing a second flexible member, a second gear display and a second gear changing mechanism, the second flexible member having a second pointer at a first end and a second spool tab at a second end, the second flexible member configured such that the second pointer is reciprocally displaceable along the second gear display in response to rotation of the handgrip, the second spool tab being removably attachable to one of said spool and said handgrip, the second flexible member configured to spool about the handlebar axis at a second radius in response to rotation of the handgrip, the second gear display indicating a second plurality of discrete shift points of the second gear changing mechanism;
    removing the first flexible member, the first gear display and the first gear changing mechanism; and
    inserting the second flexible member, the second gear display and the second gear changing mechanism.

* * * * *